United States Patent
Bonwick et al.

(10) Patent No.: US 7,877,554 B2
(45) Date of Patent: Jan. 25, 2011

(54) METHOD AND SYSTEM FOR BLOCK REALLOCATION

(75) Inventors: Jeffrey S. Bonwick, Los Altos, CA (US); William H. Moore, Fremont, CA (US); Matthew A. Ahrens, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1189 days.

(21) Appl. No.: 11/409,435

(22) Filed: Apr. 19, 2006

(65) Prior Publication Data

US 2007/0106870 A1 May 10, 2007

Related U.S. Application Data

(60) Provisional application No. 60/733,381, filed on Nov. 4, 2005.

(51) Int. Cl.
*G06F 12/00* (2006.01)
*G06F 13/00* (2006.01)
*G06F 13/28* (2006.01)
*G06F 7/00* (2006.01)
*G06F 17/00* (2006.01)

(52) U.S. Cl. ............... 711/154; 711/170; 711/E12.002; 707/697

(58) Field of Classification Search .............. None
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,742,792 A * | 4/1998 | Yanai et al. | 711/162 |
| 5,819,292 A | 10/1998 | Hitz et al. | |
| 5,963,962 A * | 10/1999 | Hitz et al. | 1/1 |
| 6,209,111 B1 | 3/2001 | Kadyk et al. | |
| 6,341,341 B1 | 1/2002 | Grummon et al. | |
| 6,636,879 B1 | 10/2003 | Doucette et al. | |
| 6,745,284 B1 | 6/2004 | Lee et al. | |
| 6,745,305 B2 | 6/2004 | McDowell | |

(Continued)

OTHER PUBLICATIONS

"FMS File Striping System," Jul. 20, 2001. Multipath Corporation, "http://web.archive.org/web/20010720134025/http://www.fmslib.com/fmsman/doc/stripe.html" pp. 1-3.*

(Continued)

*Primary Examiner*—Matt Kim
*Assistant Examiner*—Matthew R Chrzanowski
(74) *Attorney, Agent, or Firm*—Osha • Liang LLP (57) ABSTRACT

A system includes a storage pool including a first disk and a second disk, a data management unit (DMU), and a storage pool allocator (SPA). The SPA is configured to receive a request from the DMU to write a logical block, allocate a first physical block on the first disk, attempt to write the logical block to the first physical block, and allocate a second physical block on the second disk, if the attempt to write the logical block to the first physical block fails.

14 Claims, 6 Drawing Sheets

U.S. PATENT DOCUMENTS

| | | |
|---|---|---|
| 6,795,966 B1 | 9/2004 | Lim et al. |
| 6,829,617 B2 | 12/2004 | Sawdon et al. |
| 6,851,037 B2 * | 2/2005 | Watkins et al. ............. 711/202 |
| 6,857,001 B2 | 2/2005 | Hitz et al. |
| 6,892,211 B2 | 5/2005 | Hitz et al. |
| 7,007,196 B2 | 2/2006 | Lee et al. |
| 7,032,154 B2 | 4/2006 | Kidorf et al. |
| 7,043,677 B1 | 5/2006 | Li |
| 7,133,964 B2 | 11/2006 | Rodrigues et al. |
| 7,162,486 B2 | 1/2007 | Patel et al. |
| 7,174,352 B2 | 2/2007 | Kleiman et al. |
| 7,200,715 B2 | 4/2007 | Kleiman et al. |
| 7,526,622 B1 * | 4/2009 | Bonwick et al. ............ 711/162 |
| 2002/0004883 A1 | 1/2002 | Nguyen et al. |
| 2002/0055942 A1 | 5/2002 | Reynolds |
| 2002/0087788 A1 | 7/2002 | Morris |
| 2002/0091670 A1 * | 7/2002 | Hitz et al. ..................... 707/1 |
| 2002/0161972 A1 | 10/2002 | Talagala et al. |
| 2003/0033477 A1 | 2/2003 | Johnson et al. |
| 2003/0126107 A1 | 7/2003 | Yamagami |
| 2003/0145167 A1 | 7/2003 | Tomita |
| 2004/0098720 A1 | 5/2004 | Hooper |
| 2004/0107314 A1 | 6/2004 | Kim et al. |
| 2004/0123063 A1 | 6/2004 | Dalal et al. |
| 2004/0225834 A1 | 11/2004 | Lu et al. |
| 2004/0234000 A1 | 11/2004 | Page |
| 2004/0260673 A1 * | 12/2004 | Hitz et al. ..................... 707/1 |
| 2004/0268084 A1 * | 12/2004 | Longerbeam et al. ....... 711/206 |
| 2005/0010620 A1 | 1/2005 | Silvers et al. |
| 2005/0097270 A1 | 5/2005 | Kleiman et al. |
| 2005/0235154 A1 | 10/2005 | Serret-Avila |
| 2006/0015771 A1 * | 1/2006 | Van Gundy et al. ............ 714/7 |
| 2006/0107096 A1 * | 5/2006 | Findleton et al. ............... 714/6 |
| 2006/0107101 A1 | 5/2006 | Soeda |
| 2006/0168409 A1 | 7/2006 | Kahn et al. |
| 2006/0184821 A1 * | 8/2006 | Hitz et al. ..................... 714/6 |
| 2006/0218644 A1 | 9/2006 | Niles et al. |
| 2006/0224843 A1 * | 10/2006 | Rao et al. ................... 711/161 |
| 2006/0256965 A1 | 11/2006 | Rowe |
| 2006/0277386 A1 * | 12/2006 | Eguchi ....................... 711/170 |

OTHER PUBLICATIONS

Gopalan Sivathanu, Charles P. Wright, and Erez Zadok, http://web.archive.org/web/20040618230552/http://www.filesystems.org/docs/nc-checksum-tr/nc-checksum.pdf, "Enhancing File System Integrity Through Checksums", Jun. 2004, Technical Report FSL-04-04, pp. 1-5.*

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrators Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeit Jorg Schilling, eingereicht am May 23, 1991 an der Tu Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

Austin, B. "A Dynamic Disc Allocation Algorithm Designed to Reduce Fragmentation During Filing Reloading", Information Sciences Laboratory, Corporate Research and Development Center, General Electric Company, 4 pages, 1970.

Goodheart, B., Cox, J. "The Magic Garden Explained", Prentice Hall, 8 pages, 1994.

Stallings, W. "Computer Organization and Architecture: Designing for Performance", Prentice Hall, 4 pages, 2000.

Goodheart, B. et al.; "The Magic Garden Explained"; Prentice Hall, pp. 24-25, 29-30, 390-391, 1994.

Austin, B. J.; "A Dynamic Disc Allocation Algorithm Designed to Reduce Fragmentation During File Reloading"; pp. 378-381, 1970.

Stallings, W.; "Computer Organization and Architecture: Designing for Performance"; Prentice Hall, pp. 377-378, 2000.

* cited by examiner

METHOD AND SYSTEM FOR BLOCK REALLOCATION

CROSS-REFERENCE TO RELATED APPLICATIONS

This application claims benefit of U.S. Provisional Application Ser. No. 60/733,381 filed on Nov. 4, 2005, entitled "Block Allocation" in the names of Jeffrey S. Bonwick, William H. Moore, and Matthew A. Ahrens, which is hereby incorporated by reference.

This application is related to copending U.S. patent application Ser. No. 11/407,637, filed on Apr. 20, 2006 and entitled "Method and System for Using a Block Allocation Policy" and copending U.S. patent application Ser. No. 11/407,772, filed on Apr. 19, 2006 and entitled "Method and System for Latency-Directed Block Allocation," the entire contents of which are incorporated herein by reference. All the referenced applications are co-owned by the same assignee.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828,715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; and "Automatic Conversion of All-Zero Data Storage Blocks into File Holes" (application Ser. No. 10/853,915) filed on May 26, 2004.

BACKGROUND

A typical computer system includes one or more storage devices, e.g., volatile memory, hard disk, removable media, etc. Such storage devices are typically used to store and/or access data for using and/or operating the computer system. For example, a storage device may contain user data, operating system data, file system data, application files, temporary files, cache data, etc.

To allow for storing of data, storage devices are typically separated into segments, or physical blocks, defining physical locations on the storage devices. For example, a 1024 KB removable media device may be separated into 256 blocks of 4 KB each. The aforementioned segmentation of a storage device may be based on a physical property of the storage device, e.g., the size of a sector on a disk or any other physical property of the storage device, or may simply be a logical segmentation, e.g., wherein segments include multiple disk sectors. There are many different schemes, based on physical and/or logical properties, for segmenting a storage device.

If more than one storage device is combined, for example in a stripe or mirror, then a volume manager is used to manage the relationship between the storage devices. More specifically, the volume manager creates a logical representation of the storage devices, whereby the storage devices appear as only a single storage device to a file system using the storage pool. Accordingly, the file system accesses the storage pool using logical offsets (i.e., addresses of physical blocks), which the volume manager translates to physical locations on specific storage devices. For example, if a storage pool includes two 500 MB disks, and the file system requests data from offset 501 MB, then the volume manager reads the data from offset 1 MB on the second disk.

Once a storage device is segmented into physical blocks, the file system (or a process associated therewith) must track which physical blocks are available for use. Accordingly, the file system maintains a block allocation map, indicating which of the physical blocks in the storage pool (i.e., physical blocks at each logical offset, as describe above) have been allocated, and which physical blocks are free to be allocated. When writing data to the storage pool, the selection of which physical block(s) to allocate is typically based on physical block availability, i.e., which blocks in the block allocation map are marked as free. Once the physical block(s) has been allocated, the block allocation map is updated to reflect that the physical block(s) is no longer free and the data is written to the physical block(s). Those skilled in the art will appreciate that in this arrangement, the file system is not aware of the specific physical layout of the storage pool, and the volume manager does not have access to the block allocation map.

The following is a brief explanation of how data may be stored in a storage pool. Initially, the file system receives a request to write the data to the storage pool. Upon receiving the request, the file system allocates a physical block (i.e., a physical block at a logical offset, as described above), using a block allocation map to identify a free physical block. Subsequently, the file system requests that the volume manager store the data at the determined logical offset. The volume manager translates the logical offset to a physical location on a specific storage device, and writes the data to that location.

When the targeted storage device is offline, data cannot be written to the storage device. If a first storage device fails while a second storage device remains online, then the devices are said to belong to separate "fault domains." In other words, a failure of the first storage device does not necessarily imply a failure of the second storage device. Those skilled in the art will appreciate that because the file system only accesses a logical representation of the storage pool, provided by the volume manager, the file system does not have any awareness of the fault domains in the storage pool. Thus, if an attempt to write data fails, the file system cannot select an alternate location to store the data. Further, because the file system maintains the block allocation map, and because the file system requested that the data be written at a specific logical offset, the volume manager also cannot select an alternate location to store the data. Thus, the write fails.

SUMMARY

In general, in one aspect, the invention relates to a system. The system comprises a storage pool comprising a first disk and a second disk, a data management unit (DMU), and a storage pool allocator (SPA) configured to receive a first request from the DMU to write a logical block, allocate a first physical block on the first disk, attempt to write the logical block to the first physical block; and allocate a second physical block on the second disk, if the attempt to write the logical block to the first physical block fails.

In general, in one aspect, the invention relates to a method for writing a logical block in a storage pool. The method comprises receiving, by a storage pool allocator (SPA), a first request from a data management unit (DMU) to write the logical block, allocating, by the SPA, a first physical block on a first disk in the storage pool, attempting to write the logical block to the first physical block; and allocating, by the SPA, a second physical block on a second disk in the storage pool, if attempting to write the logical block to the first physical block fails.

In general, in one aspect, the invention relates to a computer readable medium. The computer readable medium comprises executable instructions for writing a logical block in a storage pool by receiving, by a storage pool allocator (SPA), a first request from a data management unit (DMU) to write the logical block, allocating, by the SPA, a first physical block on a first disk in the storage pool, attempting to write the logical block to the first physical block, and allocating, by the SPA, a second physical block on a second disk in the storage pool, if attempting to write the logical block to the first physical block fails.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for block reallocation. Specifically, in one embodiment of the invention, a request is received to write a logical block to a storage pool. If a physical block is allocated for the logical block on a disk in the storage pool, and the disk is offline, then another physical block is allocated for the logical block on another disk in the storage pool.

Figure 1:
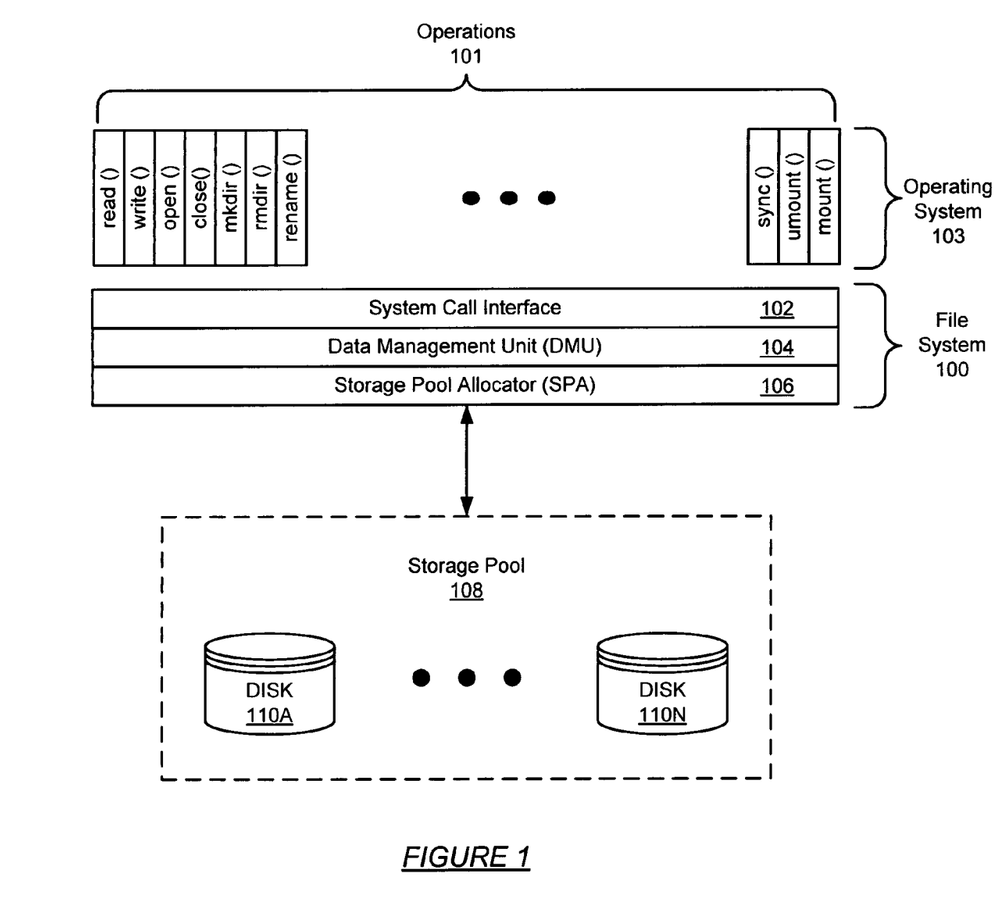
FIG. 1 shows a diagram of a system architecture in accordance with one embodiment of the invention.

FIG. 1 shows a diagram of a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into input/output (hereinafter "I/O") requests allowing related blocks to be forwarded to the SPA (106) together. The SPA (106) receives transactions from the DMU (106) and subsequently writes the blocks into the storage pool (108). The operation of the SPA (106) is described in FIG. 2 below.

In one embodiment of the invention, the storage pool (108) includes one or more physical disks (disks (100A-100N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
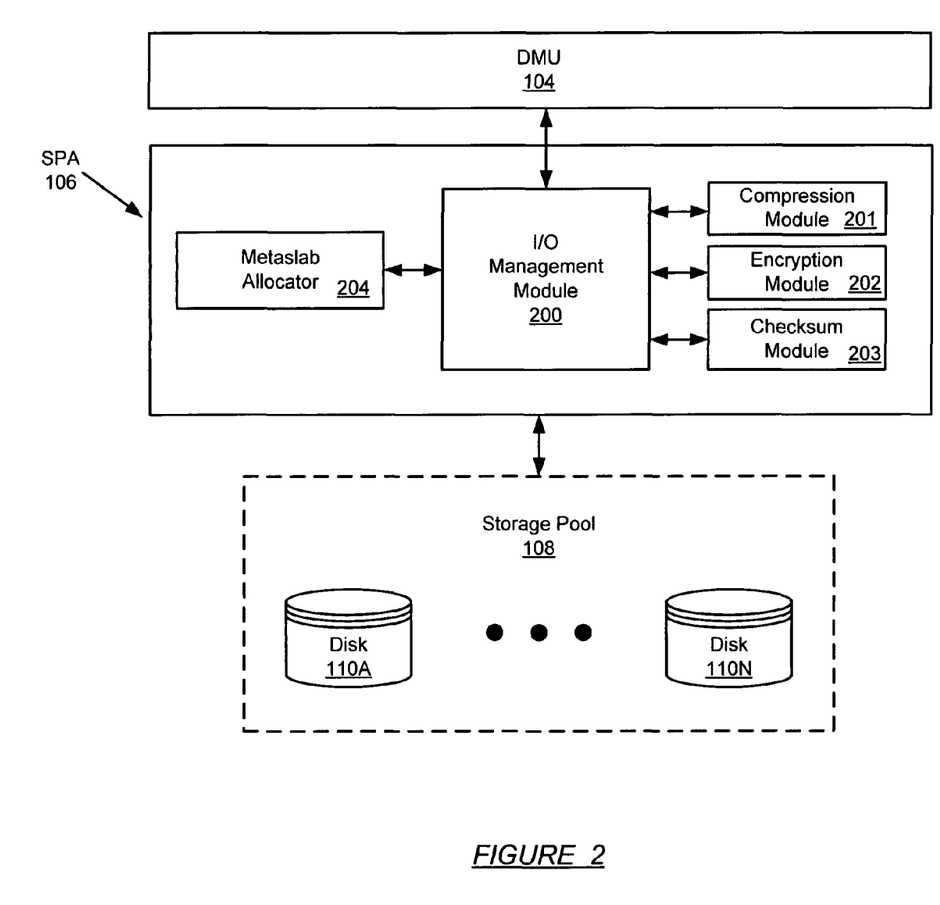
FIG. 2 shows a diagram of a storage pool allocator in accordance with one embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8 KB (kilobytes) may be compressed to a size of 2 KB for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 3:
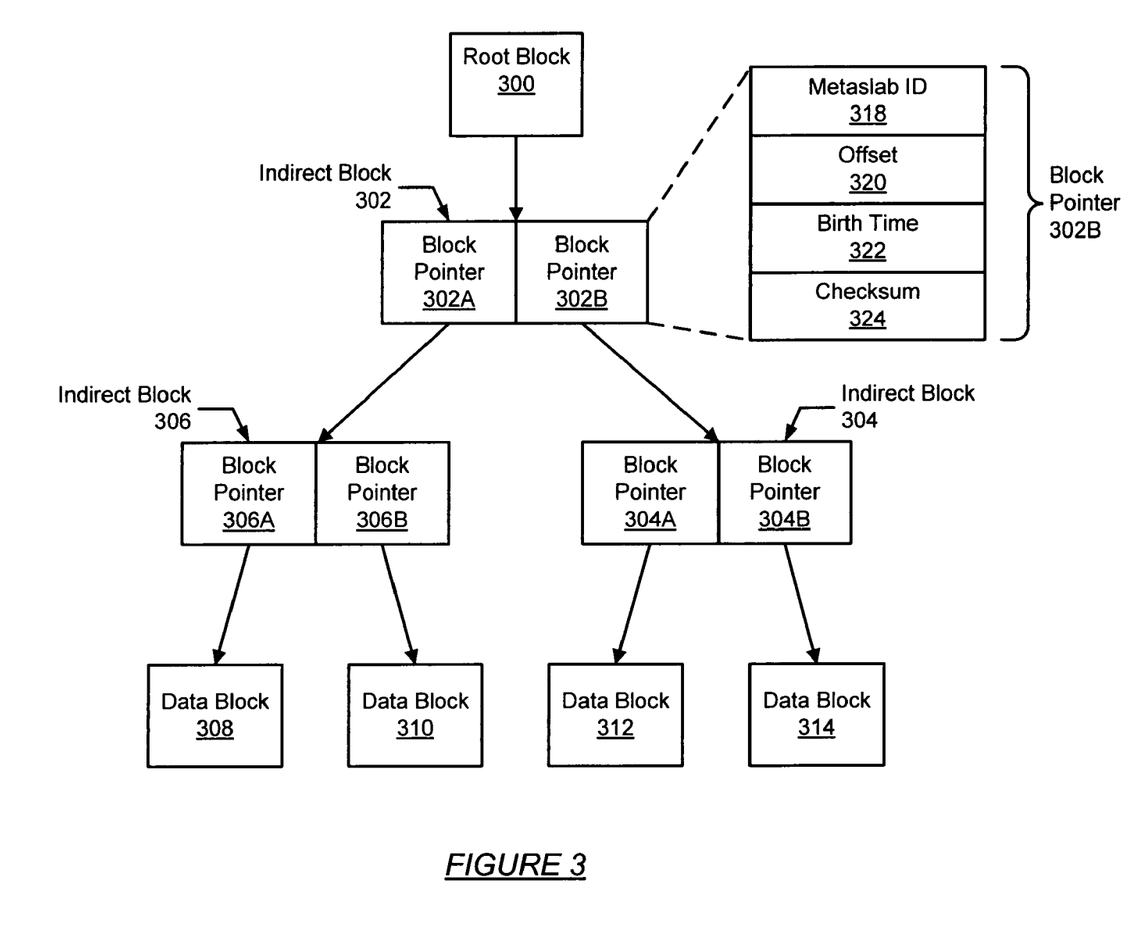
FIG. 3 shows a diagram of a hierarchical data configuration in accordance with one embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, 306). In one embodiment of the invention, indirect blocks (302, 304, 306) may be arrays of block pointers (e.g., 302A, 302B, etc.) that, directly or indirectly, reference to data blocks (308, 310, 312, 314). The data blocks (308, 310, 312, 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather, data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
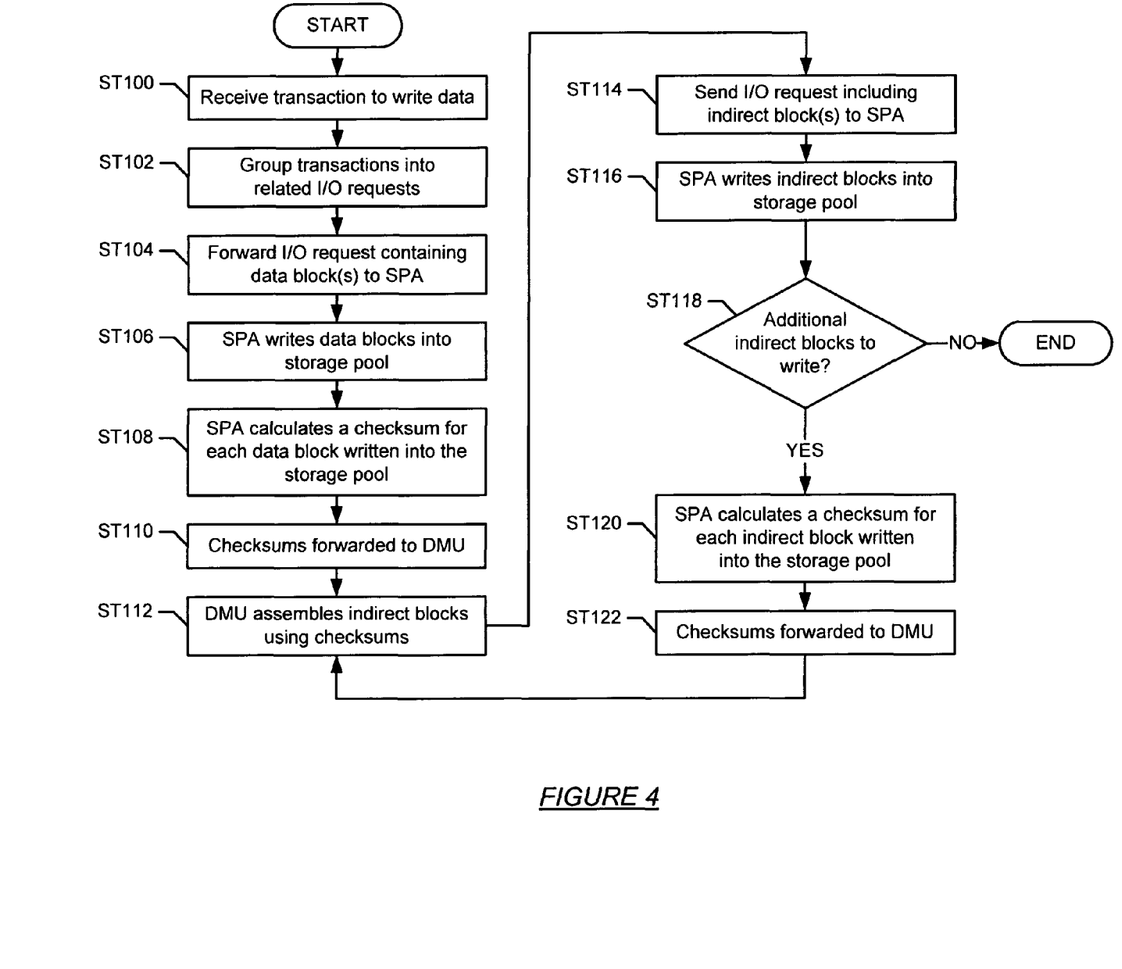
FIGS. 4-5 show a flow chart in accordance with one embodiment of the invention.

FIG. 4 shows a flow chart in accordance with one embodiment of the invention. Specifically, using the infrastructure shown in FIGS. 1-3, the following discussion of FIG. 4 describes a method for writing a block (i.e., a data block or indirect block) in accordance with one embodiment of the invention. Initially, the DMU receives a transaction from an application, the operating system (or a subsystem therein), etc. (ST100). The DMU subsequently groups the transaction into one or more I/O requests (ST102). The I/O requests are subsequently forwarded to the SPA (ST104).

In one embodiment of the invention, the transaction includes one or more data blocks, and/or one or more indirect blocks. As noted above, the file system is stored on disk using a hierarchical structure including data blocks and indirect blocks. Thus, for a given set of transactions, the first I/O request includes the data blocks to be written to disk, while subsequent I/O requests include the corresponding indirect blocks containing one or more block pointers. Accordingly, I/O request referenced in ST104 includes data blocks.

Continuing with the discussion of FIG. 4, the SPA, upon receiving the I/O request including data blocks from the DMU, writes the data blocks into the storage pool (ST106). The SPA subsequently calculates a checksum for each data block written into the storage pool (ST108). In one embodiment, the checksum module (e.g., 203 in FIG. 2) within the SPA is used to calculate the checksum for each data block written into the storage pool. The checksums are subsequently forwarded to the DMU (ST110). The DMU then assembles the indirect blocks using the checksums (ST112). Specifically, the DMU places the checksum for a given data block in the appropriate block pointer within the indirect block (i.e., the parent indirect block of the data block). Next, the indirect blocks are forwarded to the SPA (ST114). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into the storage pool (ST116). (See FIG. 5 for additional detail about ST116). A determination is then made whether additional indirect blocks exist to write into the storage pool (i.e., whether the last indirect block written to the storage pool corresponds to the root block) (ST118). If no additional indirect blocks exist, then the method is complete. However, if additional indirect blocks exist, then the SPA calculates the checksum from each of the indirect blocks written into the storage pool (ST120). The checksums for each of the indirect blocks is subsequently forwarded to the DMU (ST122). Steps ST112 through ST122 are subsequently repeated until the root block is written into the storage pool.

In one embodiment of the invention, to write a logical block (i.e., a data block or indirect block) to a storage pool (e.g., ST106 or ST116 of FIG. 4), the file system must allocate a physical block in which to write the logical block. In one embodiment of the invention, if a disk (i.e., a disk in the storage pool) on which the physical block is allocated is offline (i.e., the disk is not operational), then another physical block is allocated on another disk in the storage pool.

Figure 5:
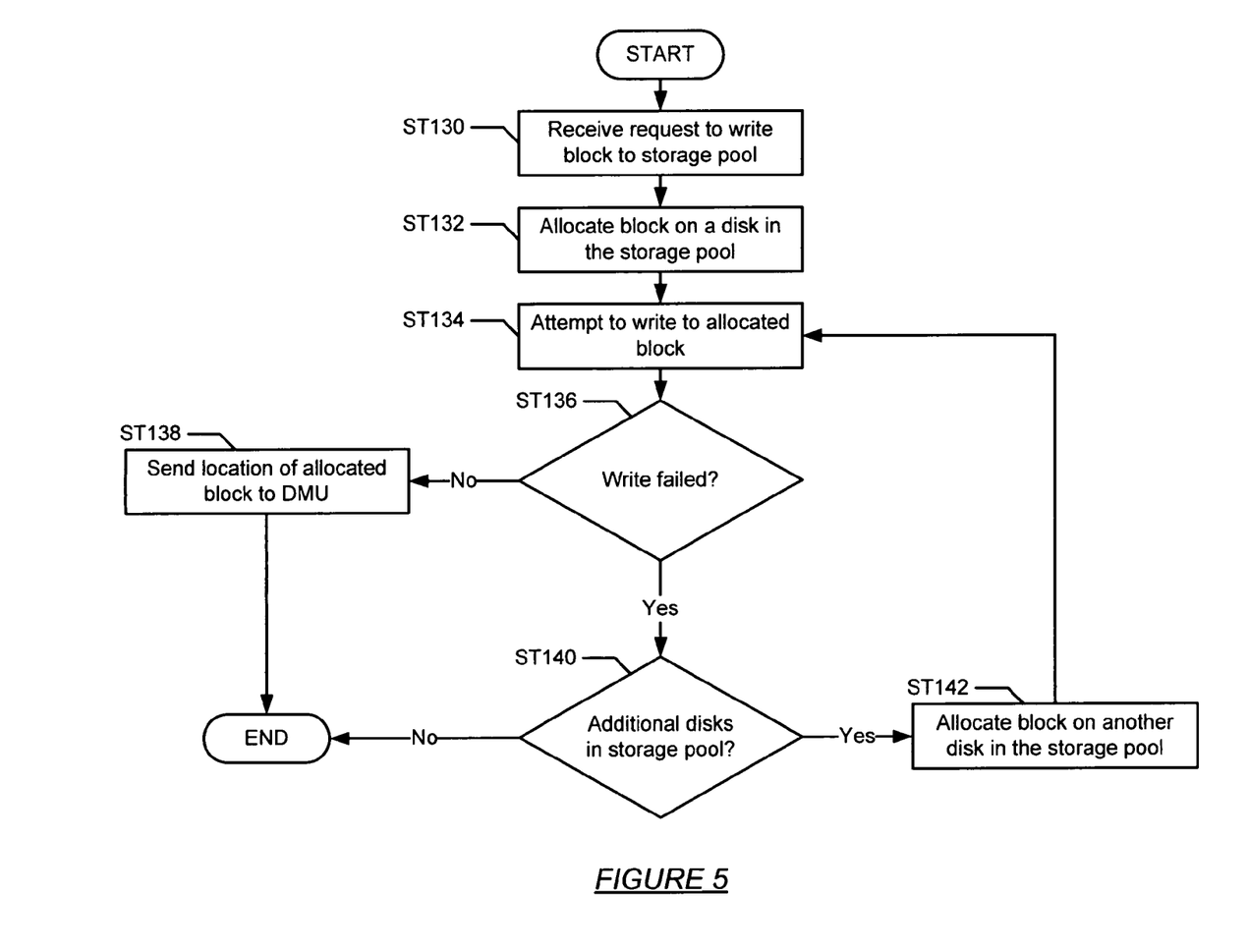

FIG. 5 shows a method for allocating blocks in a storage pool. In one embodiment of the invention, the method described in FIG. 5 is performed by the file system. In one embodiment of the invention, the SPA (i.e., a specific portion of the file system) performs the method described in FIG. 5. Turning to method of FIG. 5, initially, a request is received by the storage pool allocator (SPA) to write a logical block to the storage pool (ST130) (see, for example, FIG. 4, ST106 and/or ST116). In one embodiment of the invention, the request is received from the data management unit (DMU). In one embodiment of the invention, the logical block corresponds to either a data block or an indirect block, as discussed above.

Continuing with the discussion of FIG. 5, the SPA then proceeds to allocate a physical block on a disk in the storage pool in which to write the logical block (ST132). In one embodiment of the invention, the allocation of the physical block corresponds to selecting a free physical block in the storage pool. At this stage, the logical block has not been written to the disk; rather, only the physical location on the disk has been selected.

In one embodiment of the invention, the physical block may be allocated using a metadata-based allocation policy, a latency-based allocation policy, any other type of block allocation policy, or any combination thereof. Additional information about block allocation policies can be found in copending U.S. patent application Ser. No. 11/407,637, filed on Apr. 20, 2006 and entitled "Method and System for Using a Block Allocation Policy" and copending U.S. patent application Ser. No. 11/407,772, filed on Apr. 19, 2006 and entitled "Method and System for Latency-Directed Block Allocation."

Returning to FIG. 5, once the physical block has been allocated, an attempt is made to write the logical block to the allocated physical block (ST134). Next, a determination is made about whether the write failed (ST136). If the write did not fail (i.e., the disk was online and the write did not fail for any other reason), then the location of the allocated physical block (i.e., the location of the allocated physical block in the storage pool to which the logical block was successfully written) is sent to the DMU (ST138). Though not shown in FIG. 5, in one embodiment of the invention, the DMU places the location of the allocated physical block in the block pointer referencing the physical block that was written to disk in ST134, as discussed above.

If the write failed (e.g., if the disk has failed or is temporarily unavailable (for example, due to a power failure)) (ST136), then a determination is made about whether additional disks are available in the storage pool from which a free physical block may be allocated (ST140). If additional disks are available, then a physical block is allocated from another disk in the storage pool (ST142). In one embodiment of the invention, the physical block may be allocated using a metadata-based allocation policy, a latency-based allocation policy, any other type of allocation policy, or any combination thereof, as discussed above. At this stage, the process proceeds to ST134, using the newly allocated block. Alternatively, if no additional disks are available, then the process ends and the logical block is not written to disk. Those skilled in the art will appreciate that an appropriate action (not shown) may then be taken to handle the situation where a logical block cannot be written to any disk in the storage pool.

In one embodiment of the invention, the above method allows a physical block to be allocated from any disk in the storage pool and written to any available disk (i.e., a disk that is online) in the storage pool. Further, because the method shown in FIG. 5 may be performed for every write request, a disk that is offline for one write request may be used to service other write requests when it comes back online. Further, by allowing the SPA to determine where to allocate the physical block, the SPA can satisfy write requests even if one or more disks in the storage pool are offline.

Figure 6:
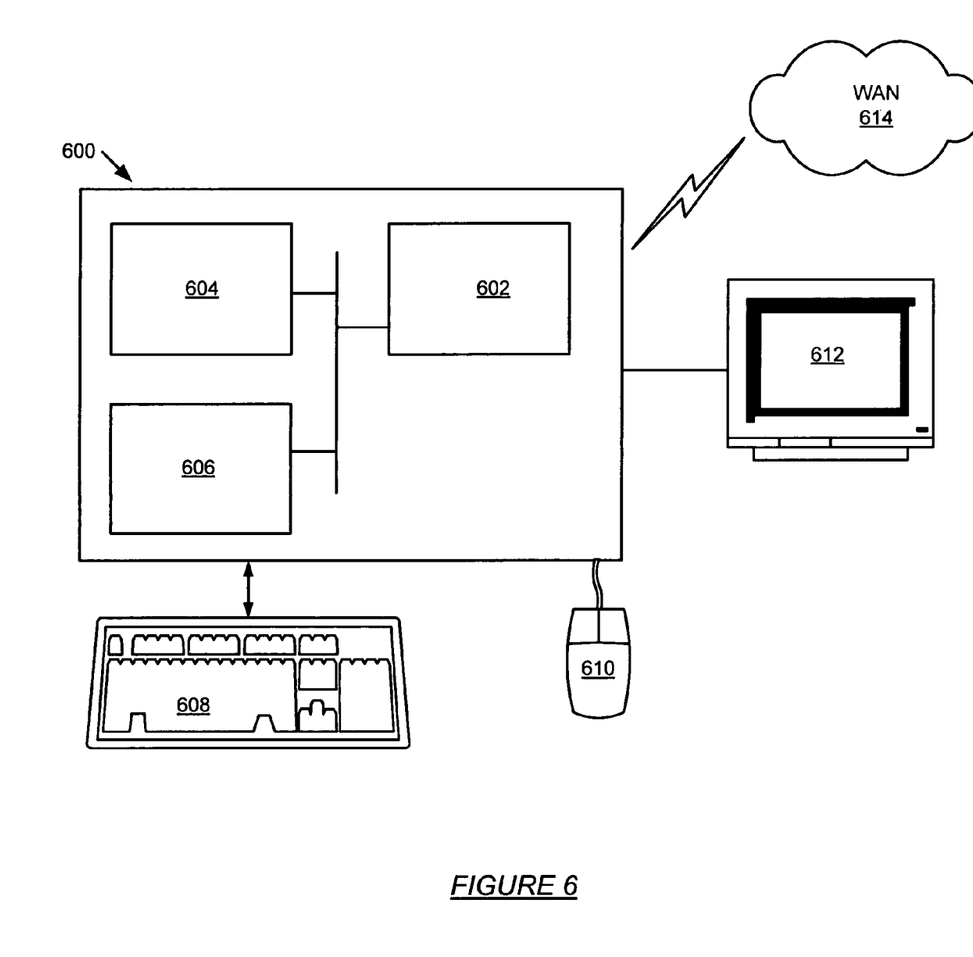
FIG. 6 shows a diagram of a computer system in accordance with one embodiment of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) may be connected to a local area network (LAN) or a wide area network (e.g., the Internet) (614) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., operating system, file system, system call interface, DMU, SPA, storage pool, disk, metaslab allocator, I/O management module, compression module, encryption module, checksum module, root block, data block, indirect block, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
 a storage pool comprising a first disk and a second disk;
 a data management unit (DMU); and
 a storage pool allocator (SPA) configured to:
  receive a first request from the DMU to write a first logical block, wherein the first logical block is a first indirect block comprising a first block pointer and a first checksum, wherein the first block pointer references a second logical block, wherein the first checksum is a checksum of the second logical block;
allocate a first physical block on the first disk;
attempt to write the first logical block to the first physical block;
allocate a second physical block on the second disk, when the attempt to write the first logical block to the first physical block fails;
write the first logical block to the second physical block when the attempt to write the first logical block to the first physical block fails;
receive a second request from the DMU to write a third logical block, wherein the third logical block is a second indirect block comprising a second block pointer and a second checksum, wherein the second block pointer references the first logical block, wherein the second checksum is a checksum of the first logical block;
allocate a third physical block on the first disk; and
attempt to write the third logical block to the third physical block.

2. The system of claim 1, wherein the SPA is further configured to:
when the attempt to write the first logical block to the first physical block is successful:
send a location of the first physical block to the DMU, after the first logical block has been written to the first physical block; and
when the attempt to write the first logical block to the first physical block fails:
send a location of the second physical block to the DMU, after the first logical block has been written to the second physical block.

3. The system of claim 2, wherein the DMU is configured to:
place the location of the first physical block in the second block pointer of the second indirect block when the attempt to write the first logical block to the first physical block is successful;
place the location of the second physical block in the second block pointer of the second indirect block when the attempt to write the first logical block to the first physical block fails; and
send a second request to the SPA to write the second indirect block to the storage pool, wherein the second indirect block comprises one selected from a group consisting of the location of the first physical block and the location of the second physical block.

4. The system of claim 1, wherein the first physical block is allocated using a metadata-based allocation policy.

5. The system of claim 1, wherein the first physical block is allocated using a latency-based allocation policy.

6. A method for writing a logical block in a storage pool, comprising:
receiving, by a storage pool allocator (SPA), a first request from a data management unit (DMU) to write a first logical block, wherein the first logical block is a first indirect block comprising a first block pointer and a first checksum, wherein the first block pointer references a second logical block, wherein the first checksum is a checksum of the second logical block;
allocating, by the SPA, a first physical block on a first disk in the storage pool;
attempting to write the first logical block to the first physical block;
allocating, by the SPA, a second physical block on a second disk in the storage pool, when attempting to write the first logical block to the first physical block fails;
writing the first logical block to the second physical block when the attempt to write the first logical block to the first physical block fails;
receiving a second request from the DMU to write a third logical block, wherein the third logical block is a second indirect block comprising a second block pointer and a second checksum, wherein the second block pointer references the first logical block, wherein the second checksum is a checksum of the first logical block;
allocating a third physical block on the first disk; and
attempting to write the third logical block to the third physical block.

7. The method of claim 6, further comprising:
when the attempt to write the first logical block to the first physical block is successful:
sending a location of the first physical block to the DMU, after the first logical block has been written to the first physical block; and
when the attempt to write the first logical block to the first physical block fails:
sending a location of the second physical block to the DMU, after the first logical block has been written to the second physical block.

8. The method of claim 7, further comprising:
placing, by the DMU, the location of the first physical block in the second block pointer of the second indirect block when the attempt to write the first logical block to the first physical block is successful;
placing, by the DMU, the location of the second physical block in the second block pointer of the second indirect block when the attempt to write the first logical block to the first physical block fails; and;
sending a second request to the SPA to write the second indirect block to the storage pool, wherein the second indirect block comprises one selected from a group consisting of the location of the first physical block and the location of the second physical block.

9. The method of claim 6, wherein the first physical block is allocated using a metadata-based allocation policy.

10. The method of claim 6, wherein the first physical block is allocated using a latency-based allocation policy.

11. A non-transitory computer readable medium comprising executable instructions for writing a logical block in a storage pool by:
receiving, by a storage pool allocator (SPA), a first request from a data management unit (DMU) to write a first logical block, wherein the first logical block is a first indirect block comprising a first block pointer and a first checksum, wherein the first block pointer references a second logical block, wherein the first checksum is a checksum of the second logical block;
allocating, by the SPA, a first physical block on a first disk in the storage pool;
attempting to write the first logical block to the first physical block;
allocating, by the SPA, a second physical block on a second disk in the storage pool, when attempting to first logical block to the first physical block fails;
writing the first logical block to the second physical block when the attempt to write the first logical block to the first physical block fails;
receiving a second request from the DMU to write a third logical block, wherein the third logical block is a second indirect block comprising a second block pointer and a second checksum, wherein the second block pointer references the first logical block, wherein the second checksum is a checksum of the first logical block;

allocating a third physical block on the first disk; and attempting to write the third logical block to the third physical block.

12. The computer readable medium of claim 11, further comprising executable instructions for writing a logical block in a storage pool by:

when the attempt to write the first logical block to the first physical block is successful:

sending a location of the first physical block to the DMU, after the first logical block has been written to the first physical block; and when the attempt to write the first logical block to the first physical block fails:

sending a location of the second physical block to the DMU, after the first logical block has been written to the second physical block.

13. The computer readable medium of claim 12, further comprising executable instructions for writing a logical block in a storage pool by:

placing, by the DMU, the location of the first physical block in the second block pointer of the second indirect block when the attempt to write the first logical block to the first physical block is successful;

placing, by the DMU, the location of the second physical block in the second block pointer of the second indirect block when the attempt to write the first logical block to the first physical block fails; and sending a second request to the SPA to write the second indirect block to the storage pool, wherein the second indirect block comprises one selected from a group consisting of the location of the first physical block and the location of the second physical block.

14. The computer readable medium of claim 11, wherein the first physical block is allocated using at least one selected from the group consisting of a metadata-based allocation policy and a latency-based allocation policy.

* * * * *